United States Patent [19]
Satoh et al.

[11] Patent Number: 5,393,028
[45] Date of Patent: Feb. 28, 1995

[54] POWER-OPERATED SEAT DEVICE FOR VEHICLE

[75] Inventors: Munetaka Satoh, Kariya; Sadao Ito, Anjo; Hiroshi Nawa, Kariya, all of Japan

[73] Assignee: Aisin Seiki Kabushiki Kaisha, Kariya, Japan

[21] Appl. No.: 68,527

[22] Filed: May 28, 1993

[30] Foreign Application Priority Data

May 29, 1992 [JP] Japan .................. 4-138718

[51] Int. Cl.⁶ .................................... F16M 13/00
[52] U.S. Cl. .................................... 248/429; 248/420
[58] Field of Search ........... 248/424, 429, 430, 419, 248/420; 297/317, 318, 322, 329, 346

[56] References Cited

U.S. PATENT DOCUMENTS

| | | | |
|---|---|---|---|
| 3,223,377 | 12/1965 | Robbins | 248/419 |
| 4,838,511 | 6/1989 | Terada et al. | 248/429 |
| 4,915,340 | 4/1990 | Nawa et al. | 248/419 X |
| 5,125,611 | 6/1992 | Cox | 248/420 X |
| 5,267,717 | 12/1993 | Isomura | 248/419 X |

FOREIGN PATENT DOCUMENTS

| | | | |
|---|---|---|---|
| 0166537 | 8/1985 | Japan | 248/429 |
| 0026138 | 2/1987 | Japan | 248/429 |
| 0184939 | 8/1987 | Japan | 248/430 |
| 64-19536 | 1/1989 | Japan . | |

*Primary Examiner*—Karen J. Chotkowski
*Attorney, Agent, or Firm*—Finnegan, Henderson, Farabow, Garrett and Dunner

[57] ABSTRACT

A power-operated seat device is comprised of a pair of laterally spaced lower rails for mounting on a floor of a vehicle body, a pair of upper rails slidably mounted on the respective lower rails, a screw shaft rotatably mounted to each of the upper rails, a nut member threadably mounted on the screw shaft, driving device mounted on each of the upper rails and threadably engaged with the screw shaft for moving each upper rail, and a supporting device for mounting the nut member to lower rail, the supporting device including a first bracket to which the nut member is fixedly mounted, a second bracket secured to the lower rail, and a connecting device for connecting the first bracket and the second bracket.

7 Claims, 3 Drawing Sheets

5,393,028

POWER-OPERATED SEAT DEVICE FOR VEHICLE

BACKGROUND OF THE INVENTION

1. Field of the Invention

The present invention relates to a power-operated seat device for a vehicle.

2. Description of Related Art

In Japanese utility model application laid-open publication No. 19536/the 64th year of Showa (1989) published in 1989 without examination, a power-operated seat device for a vehicle is disclosed, which includes a pair of laterally spaced lower rails, a pair of upper rails slidably mounted to corresponding lower rails and carrying a seat, a screw shaft rotatably supported to the upper rail, a nut member mounted on the lower rail for screwing onto the screw shaft, and a driving mechanism for rotating the screw shaft. When the screw shaft is brought into rotation by the driving mechanism, the relative movement between the nut member and the screw shaft will move the upper rail relative to the lower rail, which results in the adjustment of the seat position in the lengthwise direction relative to the vehicle body.

In the foregoing conventional power-operated seat device, the fixing of each of the screw shaft and the driving mechanism on the upper rail, and the fixing of the nut member on the lower rail is established along opposite directions, with the result that the assembly operation of the seat device becomes very cumbersome.

SUMMARY OF THE INVENTION

It is, therefore, an object of the present invention to provide a power-operated seat device for a vehicle without the foregoing drawback.

It is another object of the present invention to provide a power-operated seat device in which the fixing of each element on the upper rail, and the fixing of each element on the lower rail can be established along a common direction.

In order to achieve these objects and other advantages and in accordance with the purpose of this invention, as embodied and broadly described, there is provided a power-operated seat device which comprises a pair of laterally spaced lower rails for mounting on the floor of a vehicle body, a pair of upper rails slidably mounted on the respective lower rails, a screw shaft rotatably mounted to each of the upper rails, a nut member threadably mounted on the screw shaft, a driving device mounted on each of the upper rails and threadably engaged with the screw shaft for moving each upper rail, and a supporting device for mounting the nut member to the lower rails, the supporting member including a first bracket to which the nut member is fixedly mounted, a second bracket secured to the lower rail, and a connecting device connecting the first bracket and the second bracket.

BRIEF DESCRIPTION OF THE DRAWINGS

Additional objects and advantages of the present invention will become apparent from the following detailed description of preferred embodiments thereof when considered with reference to the attached drawings, in which.

DESCRIPTION OF THE PREFERRED EMBODIMENTS

Reference will now be made in detail to the present preferred embodiments of the invention, examples of which are illustrated in the accompanying drawings.

Figure 1:
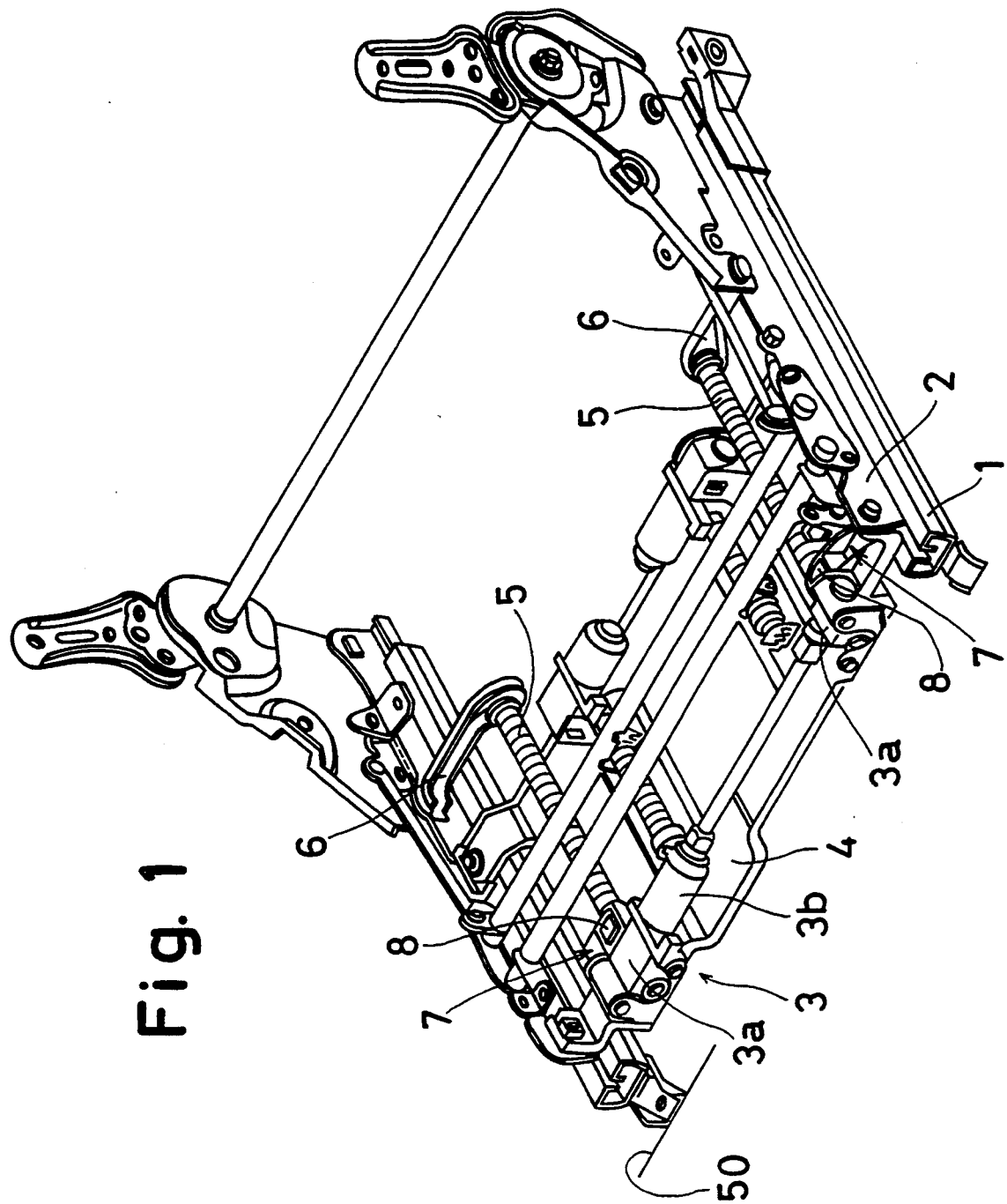
FIG. 1 is a perspective view of an embodiment of a power-operated seat device in accordance with the present invention.

Referring to FIG. 1, a power operated seat device for a vehicle comprises a pair of parallel spaced lower rails 1 to which a pair of upper rails 2 are slidably mounted, are secured to the floor of a vehicle-body. A bracket 4 is secured at its opposite ends to the upper rails 2; and a driving mechanism 3, which will be described hereafter, is mounted on the bracket 4. A screw shaft 5 is rotatably supported at its one end to a bracket 6 which is secured to the upper rail 2. The other end of the screw shaft 5 is operatively connected to a motor 3b via a reducer 3a both of which are part of the driving mechanism 3. A nut member 8 which is threadably mounted on the screw shaft 5 is supported via a supporting member 7 to the lower rail 1 as hereinafter described.

When the motor 3b is turned on, the resulting rotation is transmitted to the screw shaft 5 via the reducer 3a. Due to this rotation, the nut member 8 which is in threaded engagement with the screw shaft 5 is urged to move along the screw shaft. However, due to the fact that the nut member 8 is secured to the lower rail 1, the screw shaft 5 moves along with the upper rail 2 relative to the lower rail 1. Thus, the position of the seat device is adjusted in the lengthwise direction of the vehicle-body.

Figure 2:
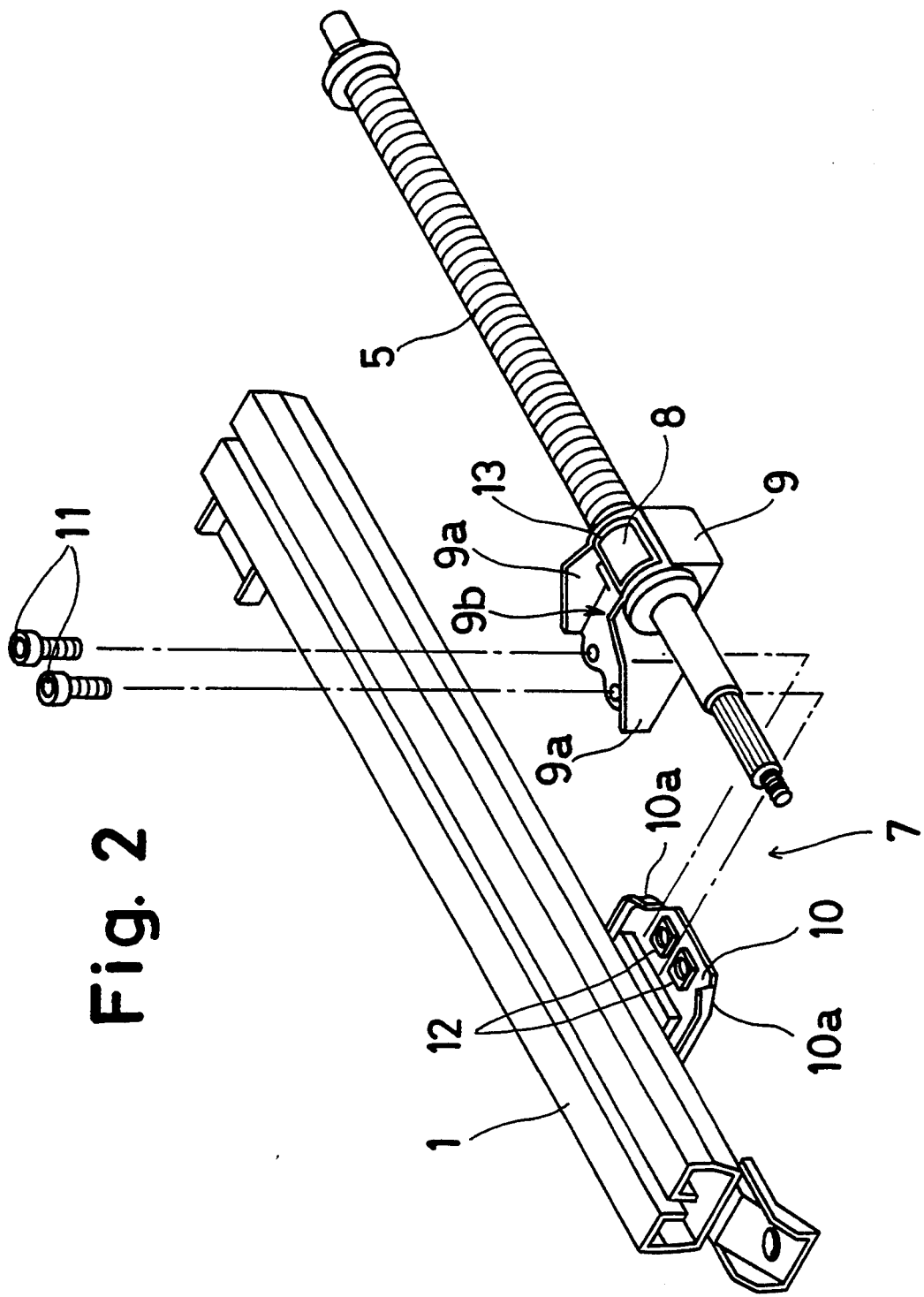
FIG. 2 is an exploded perspective view of a portion of the device shown in FIG. 1.

The supporting member 7, as best shown in FIG. 2, includes a first bracket 9 and a second bracket 10. The first bracket 9 is in a substantial U-shaped configuration having a pair of spaced walls 9a and a gap 9b formed therebetween for accommodating the nut member 8 and a cushion member 13. The screw shaft 5 is set to be passed through the bracket 9 in such a manner that the screw shaft 5 is inserted into an opening (not shown) of the wall 9a so as to be threaded with the nut member 8. The second bracket 10 is welded to a bottom portion of the lower rail 1. The first bracket 9 and the second bracket 10 are connected to each other in such a manner that a pair of common bolts 11 passing through both brackets 9 and 10, are screwed into a pair of corresponding nut members 12 which are secured to the second bracket 10. Thus, the nut member 8 is fixedly supported by the lower rail 1 via the supporting member 7. In addition, the second bracket 10 is provided with a pair of longitudinally extending spaced flanges 10a so that the first bracket 9 is positioned between the flanges 10a of the second bracket 10 when assembled. Thus, the position of the first bracket 9 relative to the second bracket 10 is determined, and filed, and sufficient strength is assured where the first bracket 9 is connected to the second bracket 10.

An assembly procedure for constructing the power operated seat device is described. Initially, a first subassembly is prepared by assembling the lower rail 1, the upper rail 2, and the second bracket 10. Next, the driving mechanism 3, the bracket 4, the screw shaft 5, the nut member 8, and the first bracket 9 are assembled, which constitutes a second assembly. Thereafter, the second assembly is secured to the upper rail 2 in such a manner that the bracket 4 and the bracket 6 are welded to the upper portion of the upper rail 2. Moreover, the first bracket 9 and the second bracket 10 are fastened to each other in such a manner that the bolts 11 are screwed into the corresponding nut members 12. Thus, the second assembly is fixed to the first assembly, resulting in the driving means 3, the screw shaft 5 and the nut member 8, each of which is said to be a functional element, being secured to the upper rail 2 and the lower rail 1 via the bracket 4, the bracket 6, and the supporting member 7.

As mentioned above, the first subassembly, which is previously assembled, can be secured to the second subassembly, which is also previously assembled, only by moving the first subassembly onto the second subassembly along a straight line, with the result that the assembly operation of the seat device becomes simple, which in turn leads to an improvement of assembly productivity, and enables automation of the seat device assembly.

Figure 3:
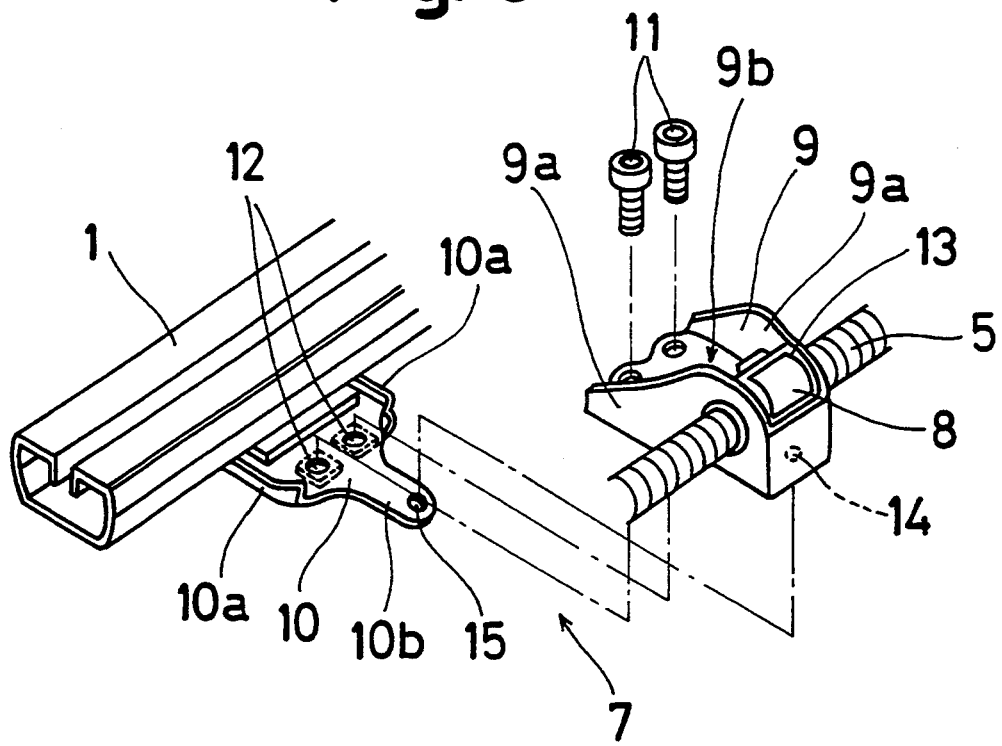
FIG. 3 is a fragmentary exploded view illustrating a modification of the structure shown in FIG. 2.
Figure 4:
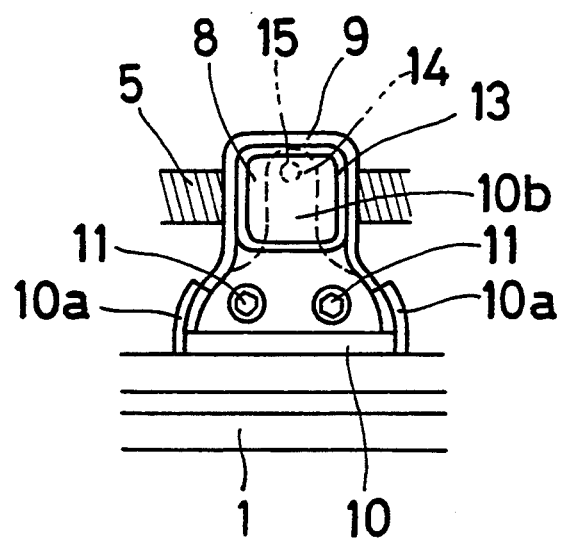
FIG. 4 is a fragmentary plan view of the structure shown in FIG. 3.

FIGS. 3 and 4 show a second embodiment of the present invention. In this embodiment, a bottom wall of the first bracket 9 is provided with a concave portion 14 which is expected to engage with a convex portion 15 provided on an extension 10b of the second bracket 10. The extension 10b is oriented towards the other lower rail 1. The resultant structure ensures a precise position of the first bracket 9 relative to the second bracket 10 which is secured to the lower rail 1, thereby establishing a smooth rotation of the screw shaft 5 relative to the nut member 8. The foregoing male-and-female engagement between the concave portion 14 of the first bracket 9 and the convex portion 15 of the second bracket 10 share with the bolt members 11 the load received from the screw shaft 5, which results in improvement in the mechanical strength.

The principles, preferred embodiments, and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A power-operated seat device comprising:
   a pair of laterally spaced lower rails for mounting on a floor of a vehicle body;
   a pair of upper rails slidably mounted to the respective lower rails;
   a screw shaft rotatably mounted to each of the upper rails;
   a nut member threadably mounted to each screw shaft;
   driving means mounted to each of the upper rails and threadably engaged to each screw shaft for moving the upper rails; and
   supporting means for mounting each of the nut members to the lower rails, the supporting means including a first bracket to which the nut member is fixedly mounted, a second bracket secured to the lower rails, and connecting means including a male and female structural configuration of the first bracket and the second bracket connecting the first bracket and the second bracket to one another.

2. A power-operated seat device according to claim 1, wherein the connecting means comprises at least one nut and bolt member.

3. A power-operated seat device according to claim 1 further comprising positioning means fixing the first bracket and the second bracket in a predetermined space relationship.

4. A power operated seat device according to claim 1 further comprising positioning means including a pair of spaced flanges formed integrally with the second bracket holding the first bracket positioned between the flanges.

5. A power-operated seat device comprising a pair of laterally spaced lower rails for mounting on a floor of a vehicle body;
   a pair of upper rails slidably mounted to the respective lower rails;
   a screw shaft rotatably mounted to each of the upper rails;
   a nut member threadably mounted to each screw shaft;
   driving means mounted to each of the upper rails and threadably engaged to each screw shaft for moving the upper rails; and
   supporting means for mounting each of the nut members to the lower rails, the supporting means including a first bracket to which the nut member is fixedly mounted, a second bracket secured to the lower rail;
   positioning means including a pair of spaced flanges formed integrally with the second bracket holding the first bracket in a predetermined space relationship between the flanges and connecting means connecting the first bracket and the second bracket to one another.

6. A power-operated seat device according to claim 5, wherein the first bracket and second bracket further comprise a male-and-female engagement structural configuration connecting the first and second brackets to one another.

7. A power operated seat device according to claim 5 wherein the connecting means comprises at least one nut and bolt member.

* * * * *